(12) United States Patent
Kouba

(10) Patent No.: US 8,925,261 B1
(45) Date of Patent: Jan. 6, 2015

(54) STORM SHELTER

(71) Applicant: Wesley Kouba, McKinney, TX (US)

(72) Inventor: Wesley Kouba, McKinney, TX (US)

( * ) Notice: Subject to any disclaimer, the term of this patent is extended or adjusted under 35 U.S.C. 154(b) by 0 days.

(21) Appl. No.: 14/196,051

(22) Filed: Mar. 4, 2014

Related U.S. Application Data

(63) Continuation-in-part of application No. 13/352,929, filed on Jan. 18, 2012, now Pat. No. 8,661,746.

(60) Provisional application No. 61/492,025, filed on Jun. 1, 2011.

(51) Int. Cl.
*E04H 9/14* (2006.01)

(52) U.S. Cl.
CPC ..................... *E04H 9/14* (2013.01)
USPC ........................... 52/169.6; 109/1 S

(58) Field of Classification Search
CPC .............. E04H 9/12; E04H 9/14; E04H 9/145; E04H 9/15; E04H 9/16; E04B 1/0007; E04B 1/0015
USPC .......................... 52/169.6; 109/1 S
See application file for complete search history.

(56) References Cited

U.S. PATENT DOCUMENTS

| | | | |
|---|---|---|---|
| 2,936,504 A | 5/1960 | Harris | |
| 4,425,929 A | 1/1984 | Von Mosshaim | |
| 4,615,158 A | 10/1986 | Thornton | |
| 4,631,038 A | 12/1986 | Ritter et al. | |
| 4,955,166 A * | 9/1990 | Qualline et al. | 52/169.6 |
| 5,033,161 A | 7/1991 | Chavez | |
| 5,829,208 A | 11/1998 | Townley | |
| 5,930,961 A * | 8/1999 | Beaudet | 52/169.6 |
| 5,953,866 A | 9/1999 | Poole | |
| 5,956,907 A | 9/1999 | Martin | |
| 6,085,475 A | 7/2000 | Parks et al. | |
| 6,131,343 A | 10/2000 | Jackson, Jr. | |
| 6,151,841 A | 11/2000 | Green | |
| 6,161,345 A * | 12/2000 | Hope et al. | 52/169.6 |
| 6,260,312 B1 | 7/2001 | Spene et al. | |
| 6,308,466 B1 | 10/2001 | Moriarty | |
| 6,334,278 B1 | 1/2002 | Arnold | |
| 6,343,443 B1 | 2/2002 | Tylicki, Jr. | |
| 6,349,732 B1 | 2/2002 | Cooper | |
| 6,385,919 B1 | 5/2002 | McCarthy | |
| 6,393,776 B1 | 5/2002 | Waller et al. | |
| 6,415,558 B1 | 7/2002 | Cherry | |
| 6,434,896 B1 | 8/2002 | Mitchell | |
| 6,948,281 B1 | 9/2005 | Carmichael | |
| 7,051,481 B2 | 5/2006 | Delavega et al. | |
| 7,097,240 B2 | 8/2006 | Kurtz et al. | |

(Continued)

*Primary Examiner* — Andrew J Triggs
(74) *Attorney, Agent, or Firm* — Fogarty, L.L.C.

(57) ABSTRACT

Storm shelters are shown and described. In some embodiments, a storm shelter may include an elliptical-shaped enclosure configured to accommodate one or more persons during a weather event (e.g., a tornado, twister, hurricane, cyclone, typhoon, etc.). The shelter may also include one or more anchors coupled to the enclosure, the anchors configured to attach a bottom portion of the enclosure to the ground while maintaining a top portion of the enclosure above the ground during the weather event. The storm shelter may further include a hatch coupled to the enclosure via one or more hinges, the hatch configured to allow the one or more persons to enter the enclosure and to shut the enclosure from its exterior during the weather event. In some implementations, the hatch may be coupled to the enclosure via joints or hinges that allow it to be decoupled from the enclosure from within the enclosure.

20 Claims, 7 Drawing Sheets

(56) References Cited

U.S. PATENT DOCUMENTS

| | | |
|---|---|---|
| 7,690,159 B1 | 4/2010 | Arnold |
| 7,797,888 B2 | 9/2010 | Serrano |
| 8,661,746 B1 * | 3/2014 | Kouba .................. 52/169.6 |
| 2001/0037615 A1 | 11/2001 | Riech |
| 2002/0184837 A1 | 12/2002 | Shelton |
| 2003/0126805 A1 | 7/2003 | Roberts |
| 2004/0206015 A1 | 10/2004 | Greenboim |
| 2004/0221534 A1 | 11/2004 | Hanks |
| 2005/0262795 A1 | 12/2005 | Hudson, Jr. |
| 2006/0019062 A1 | 1/2006 | Hanks et al. |
| 2007/0245644 A1 | 10/2007 | Rodgers |
| 2007/0251159 A1 | 11/2007 | Wagner |
| 2008/0244998 A1 | 10/2008 | Dooley et al. |
| 2009/0025307 A1 | 1/2009 | Crichlow |
| 2010/0088974 A1 | 4/2010 | Scott, IV |
| 2012/0079780 A1 * | 4/2012 | Wirtz .................. 52/169.6 |

* cited by examiner

STORM SHELTER

CROSS-REFERENCE TO RELATED APPLICATIONS

This application is a continuation-in-part of U.S. application Ser. No. 13/352,929, filed Jan. 18, 2012, which claims the benefit of U.S. Provisional Application No. 61/492,025 filed on Jun. 1, 2011, the disclosures of which are hereby incorporated by reference herein in their entirety.

TECHNICAL FIELD

This specification relates generally to storm shelters, and, more particularly, to systems and methods for designing, manufacturing, installing, and using elliptical-shaped storm shelters configured to withstand severe weather events.

BACKGROUND

Tornadoes kill thousands of people around the world every year. According to the National Oceanic and Atmospheric Administration (NOAA), in 2011 there were over 1,800 tornados in the U.S. alone. Of these, approximately 60 were "killer tornadoes" responsible for over 550 deaths. The deadliest tornado in recorded U.S. history occurred in 1925 across Missouri, Illinois, and Indiana, leaving almost 700 people dead; another such tornado killed approximately 1,300 people in 1989 in Bangladesh.

Ordinarily, the majority of these deaths could be avoided by the use of tornado or storm shelters. Current commercially available tornado or storm shelters are composed of steel, concrete, fiberglass, or a combination thereof, and are either completely buried in the ground with an external access passage or installed within a home (e.g., a "walk-in" shelter). As the inventor hereof has recognized, however, existing shelters are bulky. They tend to take up a large amount of space in the home or yard, and can be too expensive to own and/or install. Also, commercially available shelters are typically dark, musty, damp, and prone to harboring spiders and insects, and have been known to trigger claustrophobia and other anxiety disorders.

SUMMARY

Embodiments disclosed herein are directed to systems and methods for designing, manufacturing, installing, and using storm shelters. In an illustrative, non-limiting embodiment, a shelter may include an elliptical-shaped enclosure configured to accommodate one or more persons during a severe weather event. The shelter may also include one or more anchors coupled to the enclosure, the anchors configured to attach a bottom portion of the enclosure to the ground while maintaining a top portion of the enclosure above the ground during the severe weather event. The shelter may further include a roll-top hatch coupled to the enclosure via one or more hinges, the hatch configured to allow a person to enter the enclosure and to shut the enclosure from its interior during the severe weather event.

In some cases, the severe weather event may include a tornado, twister, hurricane, cyclone, typhoon, or storm. Also, in some implementations, the enclosure may include a fiber-reinforced plastic enclosure. The anchors may include a metal or cement-based anchor extending outwardly from the bottom portion of the enclosure and configured to resist a force tending to pull the enclosure out of the ground. Moreover, an aramid or para-aramid-based band may be located at an intersection between the bottom and top portions of the enclosure.

In some embodiments, the top portion of the enclosure may be configured to allow a person to keep his or her head above the ground within the enclosure. The top portion of the enclosure may also one or more transparent or translucent areas configured to allow external light to enter the enclosure. The shelter may include one or more hinges coupled to the hatch and to the enclosure. The one or more hinges may be configured to allow the one or more persons to swivel the hatch to open or close the enclosure. The hinges may also be configured to allow the person to decouple the hatch from the enclosure from within the enclosure in response to the hatch being blocked or damaged by debris resulting from the severe weather event.

For example, the hatch may be configured to slide along an interior surface of the enclosure to allow the one or more persons to open or close the enclosure. Alternatively, the hatch may be configured to slide along an exterior surface of the enclosure. In some embodiments, a hinge may have a pin or bolt configured to be pushed outwardly from within the enclosure by a person to decouple the hatch from the enclosure. Alternatively, the one or more hinges may have a pin or bolt configured to be pulled inwardly from within the enclosure.

The shelter may further include a fastener configured to latch the hatch to enclosure during the severe weather event. In some cases, the enclosure may include a rubber trim or gasket configured to seal the enclosure from its exterior during the severe weather event. Additionally or alternatively, the hatch may include a rubber trim or gasket configured to seal the enclosure during the event.

In another illustrative, non-limiting embodiment, a shelter may include an elliptical-shaped enclosure adapted to protect a person from a storm, the enclosure having a first and second portions, the first portion configured to be buried underground and the second portion configured to rest above the ground, the second portion including at least one transparent or translucent area that allows external light to enter the enclosure. The shelter may also include one or more anchors coupled to the first portion of the enclosure and configured to resist a force tending to pull the enclosure from the ground. In some implementations, the second portion of the enclosure may allow a person seated within the enclosure to keep his or her head above ground. A hatch may be coupled to the enclosure via one or more joints configured to allow the person within the enclosure to decouple the hatch from the enclosure in response to the hatch being blocked or damaged.

In yet another illustrative, non-limiting embodiment, a shelter may include an elliptical-shaped enclosure adapted to protect a person from a storm, the enclosure having a first and second portions, the first portion configured to be buried in the ground and the second portion configured to rest above the ground. The shelter may also include a door coupled to the enclosure via one or more mounts, the one or more mounts configured to be at least partially removed by the person within the enclosure to decouple the door from the enclosure in response to the door being blocked or damaged. In some implementations, a reinforcement band may cover an intersection between the first and second portions of the enclosure. Moreover, the second portion may include at least one transparent or translucent area that allows external light to enter the enclosure.

BRIEF DESCRIPTION OF THE DRAWINGS

Reference will now be made to the accompanying drawings, wherein.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Systems and methods for designing, manufacturing, installing, and using storm shelters configured to withstand severe weather events are disclosed. Examples of "severe weather events" include tornados, twisters, hurricanes, cyclones, typhoons, etc. Although the examples discussed below may occasionally refer to specific types of severe weather events (e.g., a tornado), it should be understood that these examples are provided for sake of illustration only, and not by way of limitation.

Flying debris cause most deaths and injuries resulting from a tornado. In various embodiments, an elliptical-shaped shelter, such as described herein, may provide a cost-effective and simple solution for protecting individuals or families from being exposed to flying debris and wind during a tornado or severe storm without requiring the person or persons to be "entombed" under the ground. In some cases, an elliptical-shaped shelter may be configured to enable quick access to a shelter that utilizes a minimal amount of space in an outside yard, under a stairwell, in a closet, or in a home's foundation. For example, in some implementations, an elliptical-shaped shelter may provide a reinforced barrier impervious to penetration that meets the Federal Emergency Management Agency (FEMA) criteria of withstanding forces imposed by a 250 mph ground level wind as well as resisting perforation by a 15 lb. 2×4 board traveling at a speed of 100 mph.

Figure 1:
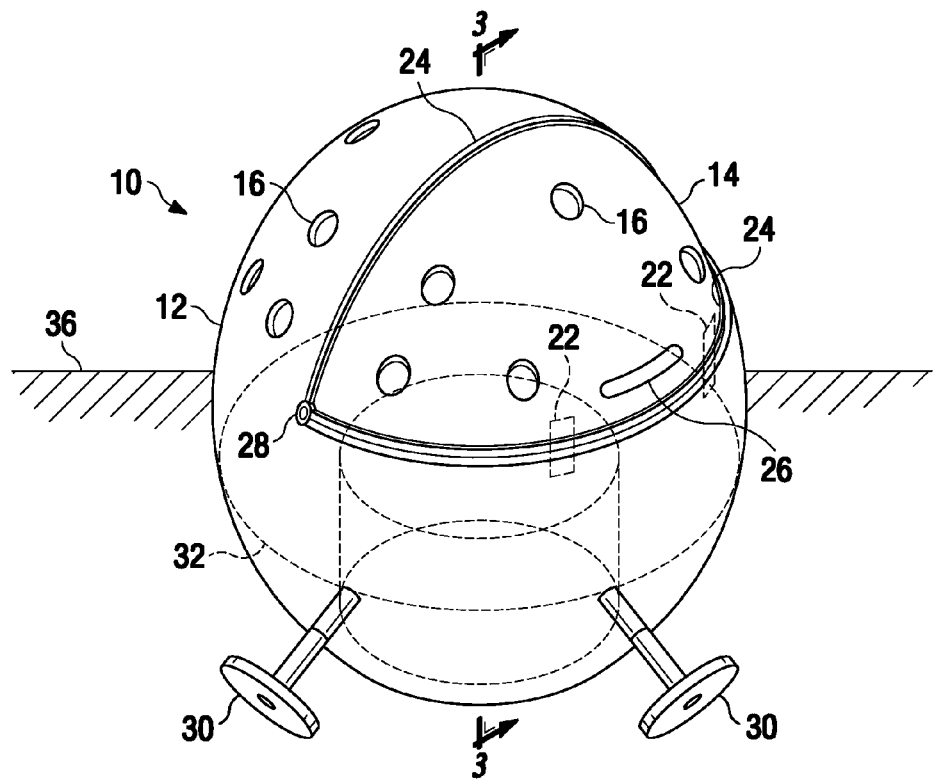
FIG. 1 illustrates a perspective view of an elliptical-shaped storm shelter according to some embodiments.
Figure 2:
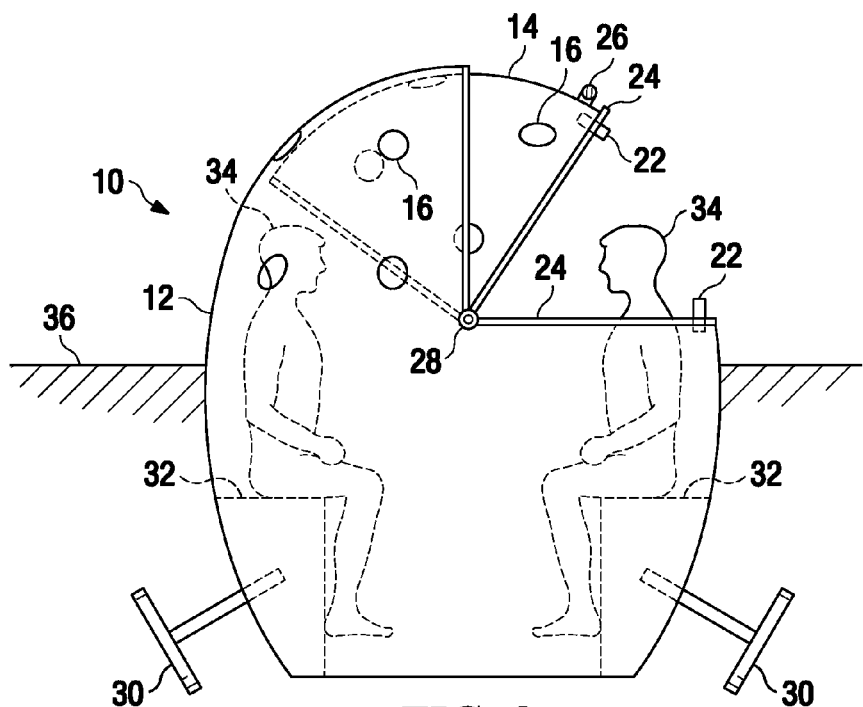
FIG. 2 illustrates a frontal view of the elliptical-shaped storm shelter in use according to some embodiments.
Figure 3:
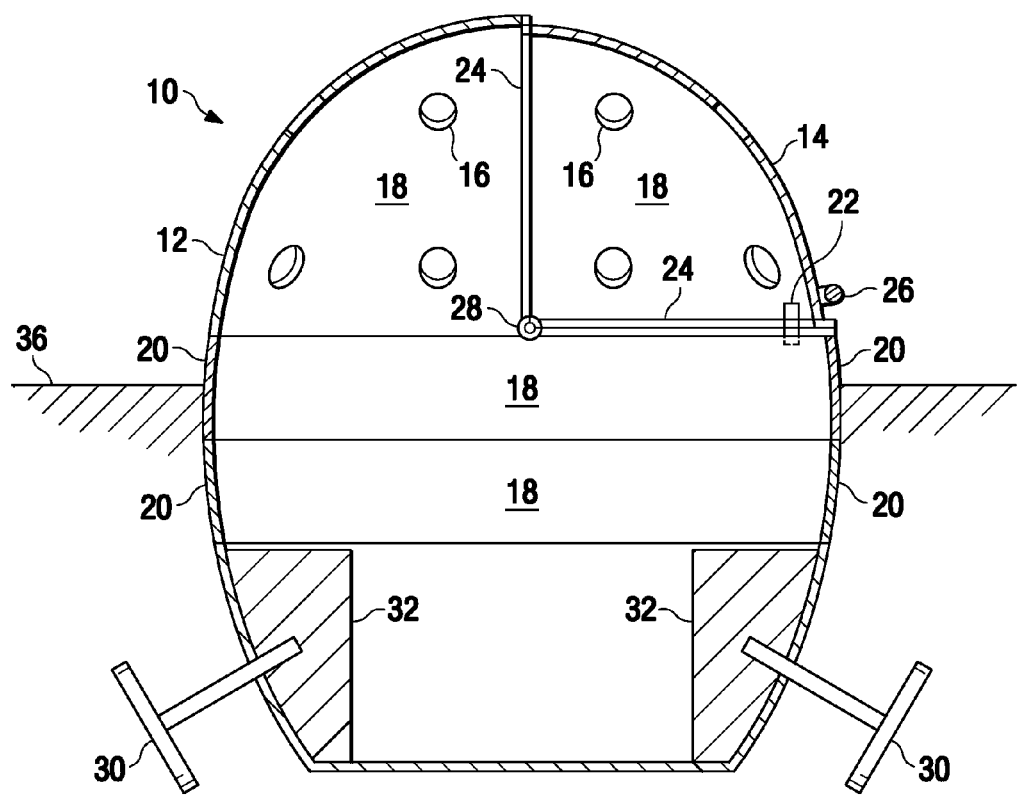
FIG. 3 illustrates a cross-sectional view of the elliptical-shaped storm shelter taken along line 3-3 shown in FIG. 1 according to some embodiments.

Turning now to FIGS. 1-3, there is shown an example of an elliptical-shaped shelter 10 according to some embodiments. Specifically, enclosure 12 may have a substantially elliptical shape configured to accommodate one or more persons 34 during a severe weather event, such as, for example, a tornado or the like. Generally speaking, enclosure 12 may also include a bottom portion and a top portion. The bottom portion may be defined as the portion of enclosure 12 that is installed below ground 36, whereas the top portion may be defined as the portion of enclosure 12 that rests above ground 36. In some cases, the top portion of enclosure 12 may be configured to allow person(s) 34 to keep their head(s) above ground 36 within enclosure 12.

As used herein, the term "elliptical-shaped" is intended to convey a substantially elliptical or oval shape. For example, as illustrated in the embodiments shown in FIGS. 2 and 3, the bottom portion of enclosure 12 may be flat to allow persons 34 to stand inside shelter 10. In these cases, although the profile of enclosure 12 is not a perfect ellipse in a strictly mathematical sense (otherwise the bottom portion of enclosure 12 would be symmetric with respect to the top portion—i.e., rounded), the term "elliptical-shaped" may nonetheless be used to characterize the general shape of enclosure 12. Moreover, although alternative embodiments may employ certain shape variations (e.g., a spherical enclosure), the inventor hereof has determined that, in various instances, the elliptical shape of enclosure 12 provides a desirable tradeoff with respect to size, manufacturing cost, and/or storm protection of shelter 10 (e.g., a compact, impact resistant structure with a small footprint and capable of reducing wind drag).

Returning to FIGS. 1-3, in some implementations, one or more anchors 30 may be attached to the bottom portion of enclosure 12 and configured to hold enclosure 12 in place in the presence of the severe weather event. As such, anchor(s) 30 may be configured to attach the bottom portion of enclosure 12 to ground 36 while maintaining the top portion of enclosure 12 above ground 36 during the event. For example, each anchor 30 may be fabricated with cement, concrete, reinforcing metal (e.g., steel) bars, etc. Anchor(s) 30 may also include a rod extending outwardly from the surface of the bottom portion of enclosure 12 along with a generally circular end portion perpendicular to the rod, the latter configured to resist a force tending to pull enclosure 12 out of ground 36. A portion of the rod that is internal to enclosure 12 may be, for example, cemented to seat(s) 32 or attached using a metal flange.

In some implementations, enclosure 12 may be manufactured in an approximately 5×5 ft mold using a composite material made of a polymer matrix or plastic. The composite material may be reinforced with fibers or the like to provide non-penetration characteristics with respect to flying debris. Examples of suitable polymers may include, but are not limited to, an epoxy, vinyl ester, and/or polyester thermosetting plastic. Conversely, examples of suitable fibers may include, but are not limited to, fiberglass, carbon, and/or aramid. For instance, in some cases enclosure 12 may be constructed out of a polycarbonate material or the like. Furthermore, enclosure 12 may be constructed using any suitable plastic molding process known in the art, such as, for instance, composite or wet molding. The fibers used for reinforcing the plastic may be installed or applied in various configurations, thus providing various degrees of protection, thermal insulation, and/or imperviousness.

Additionally or alternatively, the top portion of enclosure 12 may include an exterior and/or interior aramid, meta-aramid, or para-aramid-based reinforcement or layer 18 (e.g., KEVLAR®, NOMEX®, TECHNORA®, etc.). Moreover, in some cases, an additional reinforcement band 20 may cover the internal and/or external intersection between the bottom and top portions of enclosure 12.

In some embodiments, enclosure 12 may also include "vents" 16. For example, in certain implementations, vents 16 may be hooded openings to the exterior of enclosure 12 that allow a given amount of outside air to enter enclosure 12, for instance, through a metal grill or the like. In that case, a drain or the like may be installed at the bottom portion of enclosure 12. In other implementations, vents 16 may be transparent or translucent areas in the plastic of enclosure 12 that are configured to maintain a physical separation between the interior and the exterior of enclosure 12 while allowing some amount of external light to penetrate enclosure 12.

Shelter 10 may also include hatch or door 16 having internal or external handle 26 and coupled to an opening in enclosure 12 via one or more hinges 28. Similarly as enclosure 12, hatch 14 may also be made from a fiber-reinforced plastic and/or augmented with and internal and/or external layer of aramid material(s). For example, hatch 16 may be a "roll-top" hatch (configured to open upon being rolled up, as illustrated in FIG. 2), a "roll-down" hatch (configured to open upon being rolled down on in the reverse direction as shown in FIG. 2), or a "roll-sideways" hatch (opening in a direction perpendicular to that shown in FIG. 2). As such, hatch 14 may be configured to allow the one or more persons 34 to enter enclosure 12 through its opening and to shut enclosure 12 from its exterior during a severe weather event. For example, hatch 14 may be coupled to enclosure 12 via one or more hinges 28 (e.g., two hinges located near or at hatch 14's corners or vertices) configured to allow person(s) 34 to swivel hatch 14 up and down to open and close enclosure 12. In some cases, hatch 14 may be configured to slide along an interior surface of enclosure 12 to allow person(s) 34 to open or close enclosure 12, as shown in FIG. 2. Alternatively, hatch 14 may be configured to slide along an exterior surface of enclosure 12. Hatch 14 is at least partially spherical-lune, digon, or dangle-shaped.

Figure 4A:
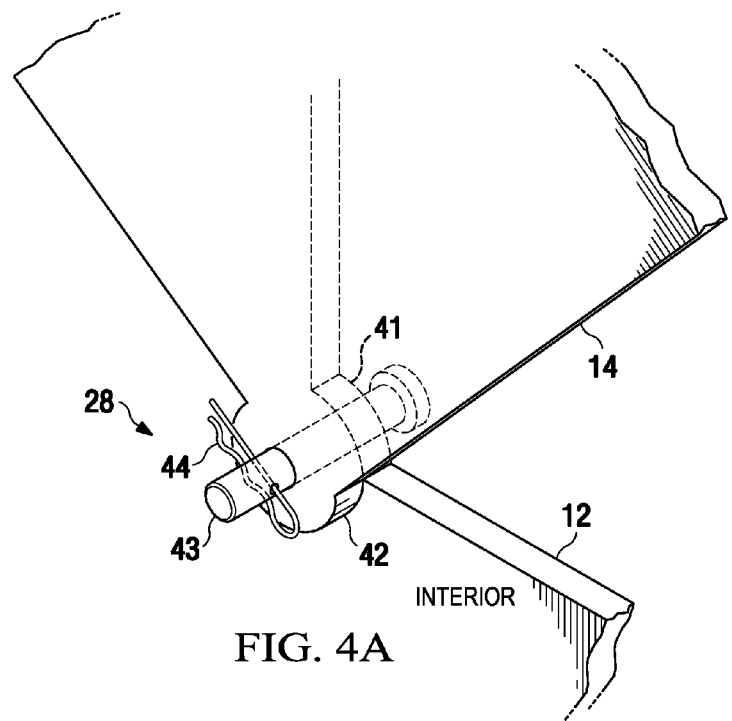
FIGS. 4A-B illustrate perspective views of a hinge system according to some embodiments.

In some implementations, hinge(s) 28 may be further configured to allow person(s) 34 to decouple hatch 14 from enclosure 12 from within enclosure 12, for example, in response to hatch 14 being blocked or damaged by debris resulting from the severe weather event. For instance, as shown in FIG. 4A (from the point of view of person(s) 34) within enclosure 12, hinge 28 may include an enclosure portion 41 (e.g., an extension or part of enclosure 12), hatch portion 42 (i.e., an extension or part of hatch 14), and pin or bolt 43. As such, pin 43 may be pushed outwardly to the exterior of enclosure 12 by person(s) 34 to decouple hatch 14 from enclosure 12. In some cases, person(s) 34 may remove safety clip 44 to free pin 43 prior to pushing it out of enclosure 12.

Figure 4B:
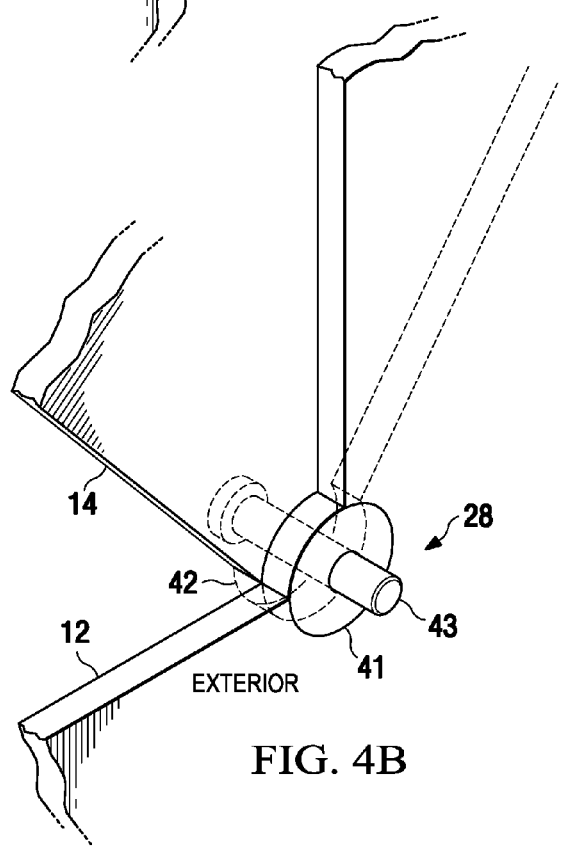

Conversely, in the example shown in FIG. 4B (from the perspective of an observer exterior to enclosure 12), hinge 28 may allow person(s) 34 within enclosure 12 to pull pin or bolt 43 inwardly to the interior of enclosure 12 in order to decouple hatch 14 from enclosure 12. In some cases, the pin may be spring loaded and can be released by person(s) 34 and pulled into the interior of enclosure 12. In some cases, the connection between enclosure portion 41, hatch portion 42, and pin or bolt 43 may be made through a threaded or non-threaded hole drilled trough the surfaces of enclosure 12 and hatch 14, respectively.

In some implementations, shelter 10 may include fastening system 22 (e.g., a clasp, latch, buckle, or the like) configured to latch hatch 14 to enclosure 12 during a severe weather event. Moreover, enclosure 12 and/or hatch 14 may include rubber trim or gasket 24 configured to seal enclosure 12 from its exterior during the severe weather event.

In the event of a tornado or other type of severe weather event, person(s) 34 may open hatch 14 (e.g., using handle 26) by swiveling it around hinge(s) 28 and sliding it along the exterior or interior wall of enclosure 12. Person(s) 34 may then enter enclosure 12 of shelter 10, swivel hatch 14 back to seal enclosure 12, and use latch 14 to lock hatch 14 in place. During the weather event, person(s) 34 may sit on seat(s) 32 while receiving some amount of light and/or air through vents 16, and while being able to maintain their head above ground 36, thus ameliorating the negative effects of claustrophobia and other anxiety disorders.

After the weather event has subsided, person(s) 34 may attempt to open hatch 14 by swiveling it around hinge(s) 28 along the surface of enclosure 12. If the weather event has caused debris to block hatch 14 from being open in the up and down direction, person(s) 36 may, depending upon the configuration of hinge(s) 28, push pin or bolt 43 out of hinge(s) 28 to decouple hatch 14 from enclosure 12.

Figure 5:
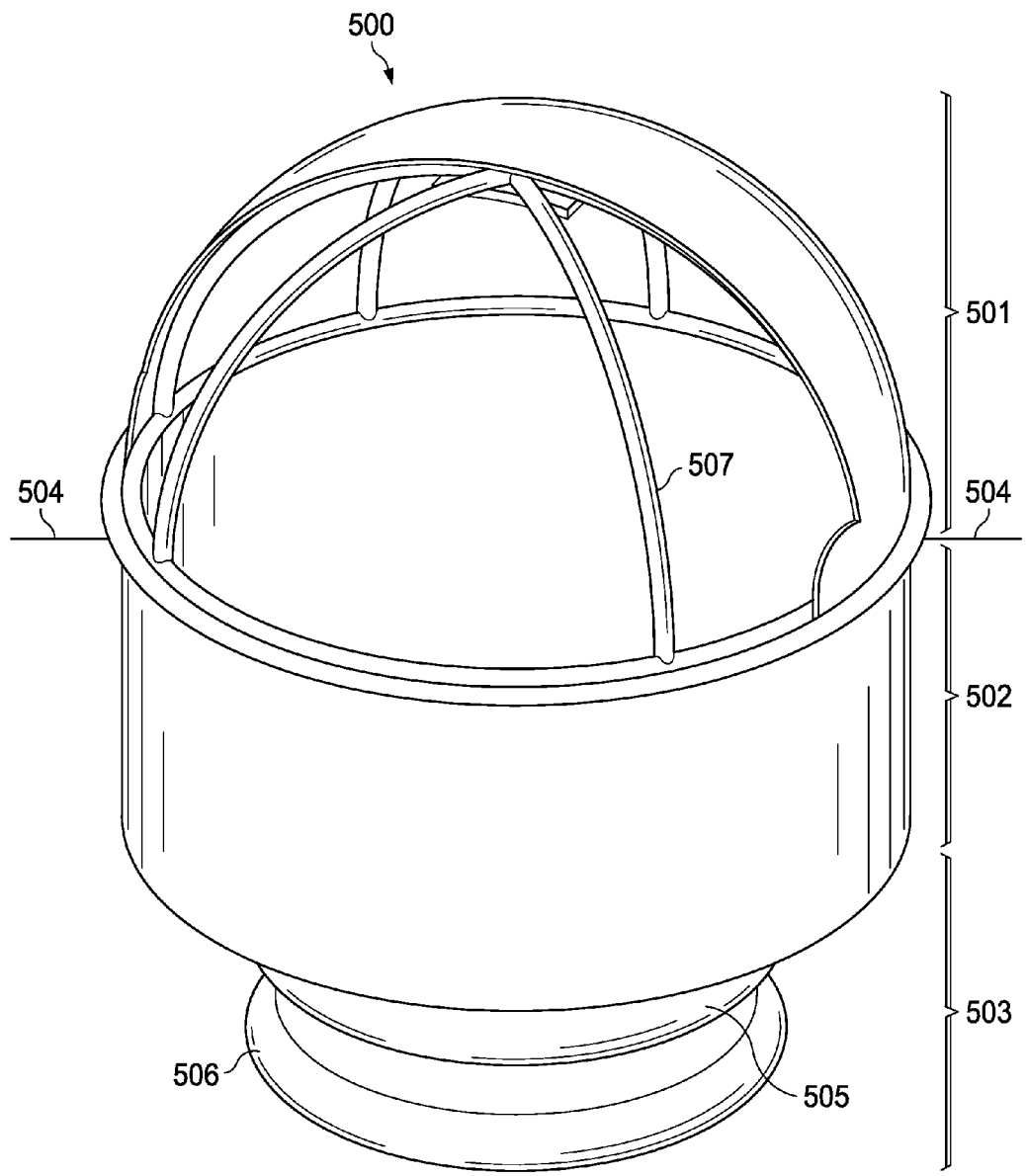
FIG. 5 illustrates an alternate embodiment of a storm shelter.

FIG. 5 illustrates an alternate embodiment of storm shelter 500 having an elliptical or hemispherical-shaped upper portion 501, cylindrical-shaped middle portion 502, and base 503. Shelter 500 may be configured to accommodate one or more persons during a severe weather event, such as, for example, a tornado, hurricane, thunderstorm, etc. Generally, shelter 500 is configured so that middle portion 502 and base 503 are installed below ground level 504 to minimize exposure of shelter 500 to the elements during a server weather event. In this configuration, only top portion 501 is exposed above ground level 504.

One or more ribs 505, 506 are formed to encircle the outer wall of base portion 503. Although two ribs 505, 506 are shown, it will be understood that any number of ribs may be provided on the exterior of base portion 503. Additionally, the size and configuration of the ribs may vary. As illustrated in FIG. 5, ribs 505, 506 are rounded and completely encircle base portion 503. In other embodiments, the ribs may have any other appropriate shape, such as square, rectangular, triangular, etc. In further embodiments, the ribs may partially encircle the base portion 503 (e.g., encircling one-quarter, one-half, or three-quarters), or the ribs may be non-continuous along the outer wall of the base portion 503 (e.g., a "dashed" or "dotted" line configuration). Ribs 505, 506 may be an integral part of shelter 500 (i.e., formed in the outer wall of base portion 503) or may be separate components that are attached or bonded to the base portion 503 (e.g., attached by an adhesive (glue, epoxy) or by a mechanical device (screws, bolts)).

Figure 6:
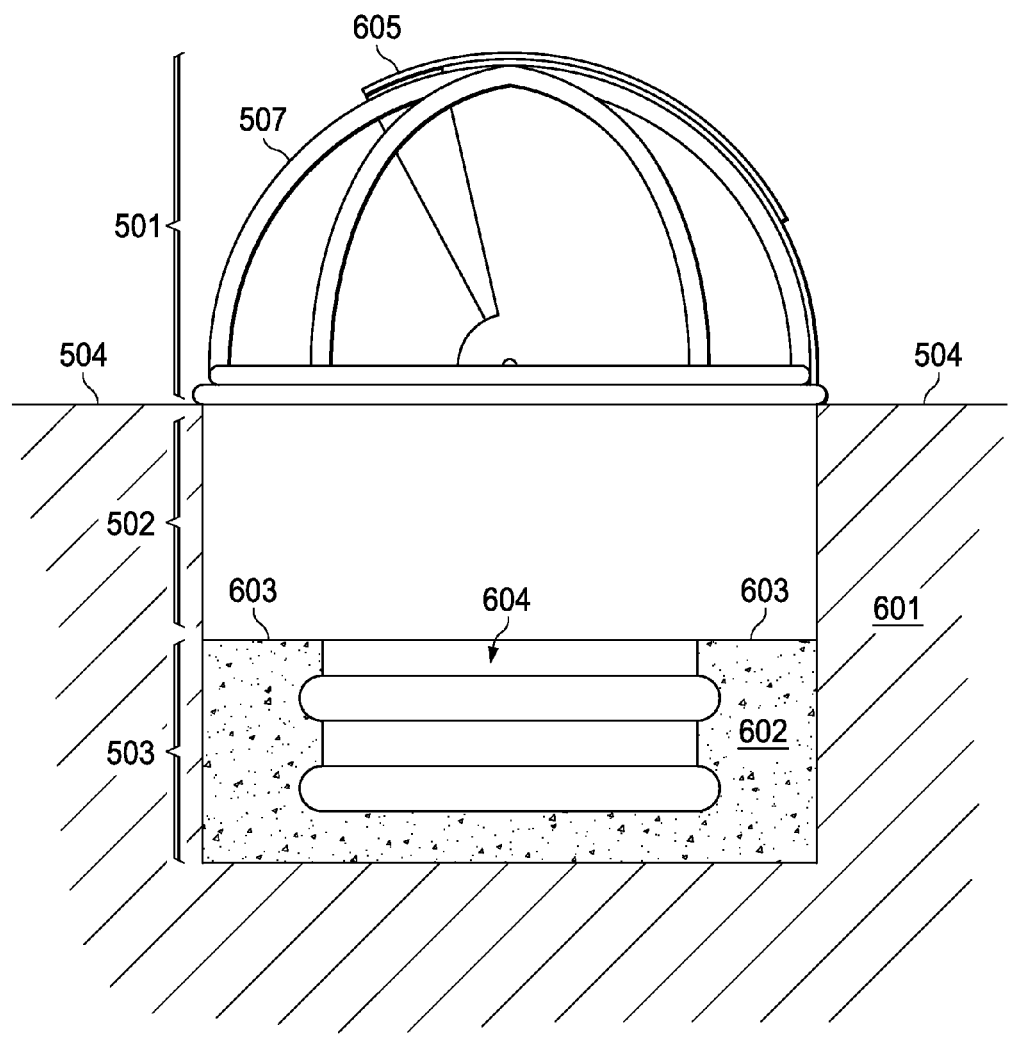
FIG. 6 is a cross-section view of the alternate embodiment of the storm shelter.

FIG. 6 is a cross-section view of shelter 500 illustrating an installation that is partially below ground level 504 according to an example embodiment. Ribs 505, 506 are configured to assist with maintaining shelter 500 firmly in place during a severe weather event. Middle portion 502 and base portion 503 are buried below ground level 504 in ground 601, which may be, for example, soil, sand, or gravel. Ribs 505, 506 in base portion 503 may be further embedded in a heavier material 602, such as, for example, cement, concrete, or stone, to ensure that shelter 500 remains securely to ground 601.

Middle portion 502 and base portion 503 are hollow and may be configured so that users may sit on a ledge or seat 603 formed by a lower surface of middle portion 502 with the users' feet and legs positioned within area 604 of base portion 503. A portion of the users' head and shoulders may be positioned in upper portion 501 while using shelter 500 depending upon the height of middle portion 502. One or more steps (not shown) may be formed or provided in middle portion 502 to aid users in entering and exiting shelter 500.

Figure 7:
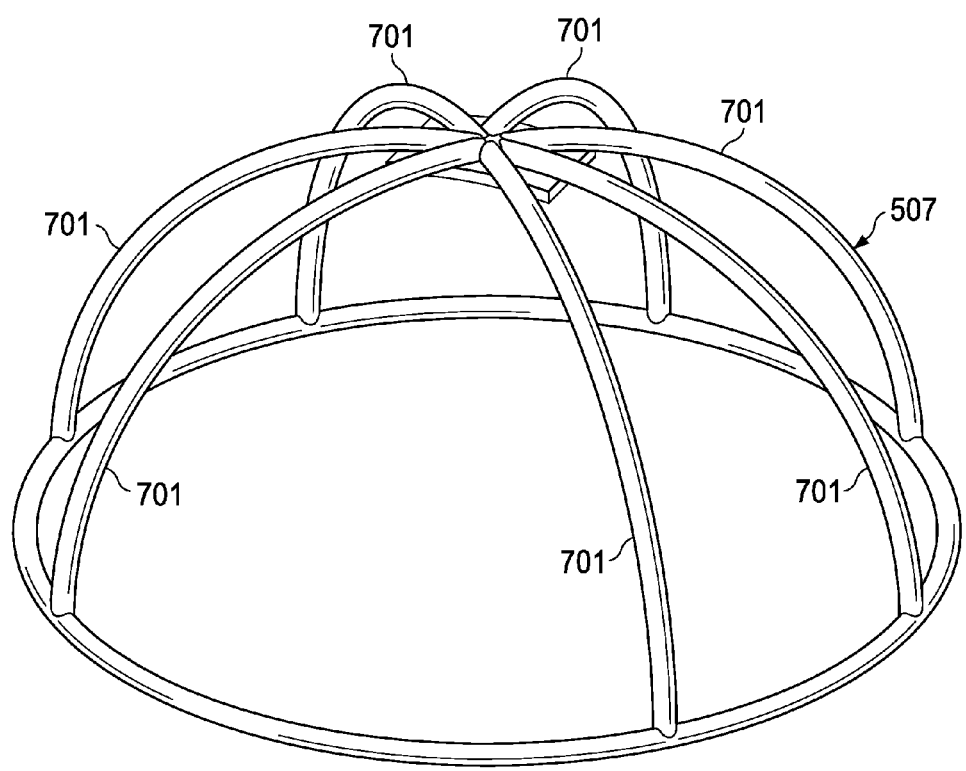
FIG. 7 further illustrates a cage structure adapted for use with the storm shelter.

FIGS. 5 and 6 illustrate a protective cage structure 507 that reinforces upper portion 501 of shelter 500. Cage structure 507 provides additional protection to users in the event that storm debris or other objects impact or land on shelter 500 during a severe weather event. FIG. 7 further illustrates an arrangement of struts 701 that comprise the cage structure 507. Struts 701 in cage structure 507 may be constructed of any appropriate material or combination of materials, such as metal, composite, laminate, or wood.

In one embodiment, cage structure 507 may be flush with and/or attached to the inner surface of upper portion 501. In this configuration, hatch 605 may be configured to rotate across the outer surface of upper portion 501. In other embodiments, cage structure 507 is offset from the inner surface of upper portion 501 to allow the hatch to rotate within upper portion 501 as illustrated in FIGS. 1-3.

Figure 8:
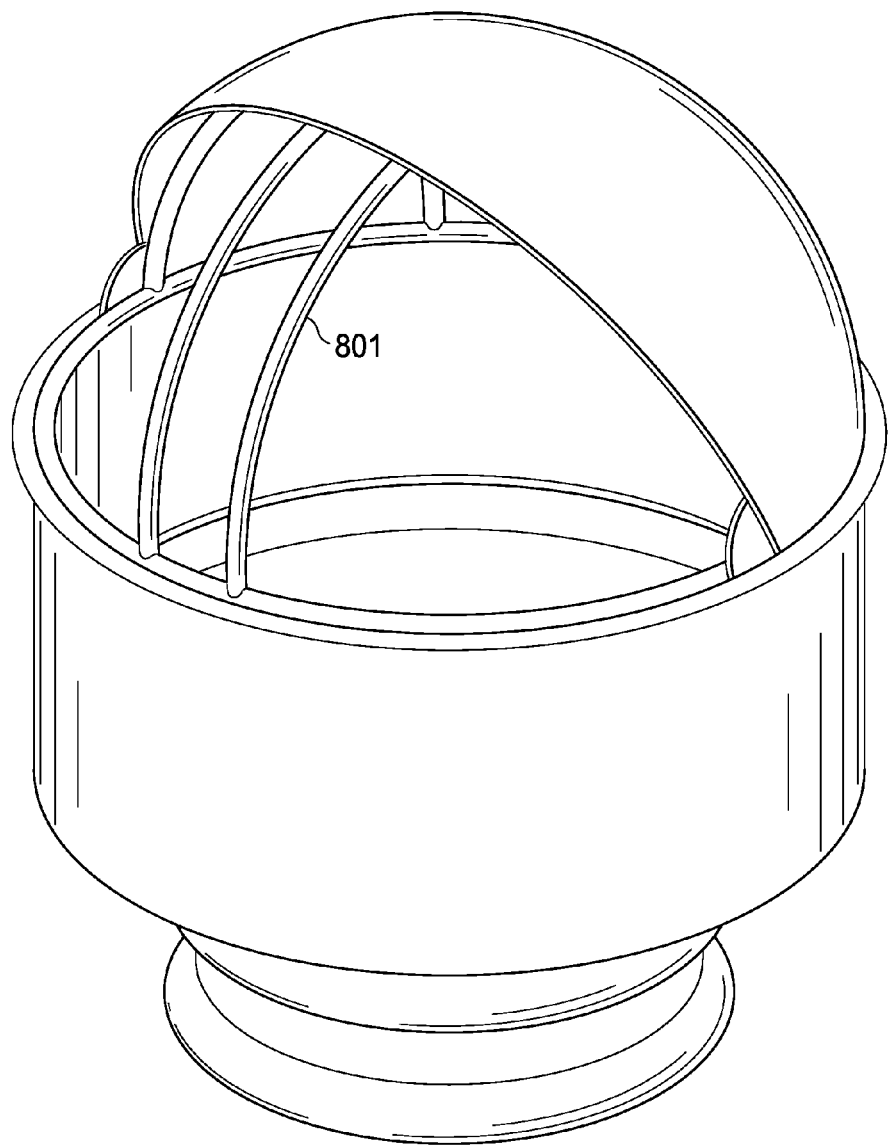
FIG. 8 illustrates an alternative embodiment of cage structure.

FIG. 8 illustrates an alternative embodiment of cage structure 801. As shown by cage structure 507 (FIGS. 5 and 7) and cage structure 801, the number and arrangement of struts used to form the cage structure may vary depending upon the configuration desired by a manufacturer. The struts may be uniformly distributed as provided by the configuration of cage structure 507. Alternatively, the struts may be positioned to provide additional support to a selected area of shelter, such as a hatch area, as provided by the configuration of cage structure 801. Other configurations may be selected to increase the amount of support or protection offered by the cage structure, to improve ease of access to the shelter, or for any other reason.

Thus, according to various systems and methods described herein, an elliptical-shaped shelter may provide a compact, dry, easily accessible alternative to conventional shelters that has a reduced footprint and is less expensive to own and install. Moreover, in some cases, the elliptical-shaped shelter may provide an open, head-above-the-ground solution that is easily accessible and keeps its inhabitants from being entombed during a storm, thus capable of decreasing the rates of death and injury caused by such events.

The various systems and methods illustrated in the figures and described herein represent example embodiments only. In other embodiments, various elements of the systems illustrated herein may be added, reordered, combined, omitted, modified, etc. Furthermore, various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A shelter, comprising:
   an enclosure configured to accommodate one or more persons during a severe weather event, the enclosure having a first cylindrical-shaped portion and a second elliptical-shaped portion, the first cylindrical-shaped portion configured to be buried underground and the second elliptical-shaped portion configured to rest above ground; and
   an at least partially spherical-lune-shaped roll-top hatch coupled to the enclosure via one or more hinges, the one or more hinges configured to allow the at least partially spherical-lune-shaped roll-top hatch to move along a surface of the enclosure to allow one or more persons to open or close the enclosure, the at least partially spherical-lune-shaped roll-top hatch configured to allow the one or more persons to enter the enclosure and to shut the enclosure's interior from the enclosure's exterior during a severe weather event.

2. The shelter of claim 1, wherein the one or more hinges are further configured to decouple the at least partially spherical-lune-shaped roll-top hatch from the enclosure from within the enclosure in response to the at least partially spherical-lune-shaped roll-top hatch being blocked or damaged by debris resulting from the severe weather event.

3. The shelter of claim 2, the one or more hinges further comprising a pin or bolt configured to be pushed outwardly from within the enclosure by the one or more persons to decouple the at least partially spherical-lune-shaped roll-top hatch from the enclosure.

4. The shelter of claim 2, the one or more hinges further comprising a pin or bolt configured to be pulled inwardly from within the enclosure by the one or more persons to decouple the at least partially spherical-lune-shaped roll-top hatch from the enclosure.

5. The shelter of claim 1, wherein the at least partially spherical-lune-shaped roll-top hatch is configured to move along an inside surface of the second elliptical-shaped portion.

6. The shelter of claim 1, wherein the at least partially spherical-lune-shaped roll-top hatch is configured to move along an outside surface of the second elliptical-shaped portion.

7. The shelter of claim 1, further comprising:
   a cylindrical-shaped base portion coupled below the first cylindrical-shaped portion, the base portion having one or more rib segments on an outer surface.

8. The shelter of claim 7, wherein the one or more rib segments have a semi-circular cross-section, and wherein the one or more ribs fully encircle the base portion.

9. The shelter of claim 7, wherein the one or more rib segments are configured to resist a force tending to pull the shelter out of the ground.

10. The shelter of claim 1, further comprising:
    a cage structure positioned within the second elliptical-shaped portion.

11. The shelter of claim 1, wherein the first cylindrical-shaped portion and the second elliptical-shaped portion comprise a fiber-reinforced plastic.

12. The shelter of claim 1, wherein the second elliptical-shaped portion is configured to allow at least one or more persons to keep his or her head above the ground within the enclosure, the second elliptical-shaped portion having one or more transparent or translucent areas configured to allow external light to enter the enclosure.

13. The shelter of claim 1, further comprising:
    a fastener configured to latch the at least partially spherical-lune-shaped roll-top hatch to the enclosure during the severe weather event.

14. The shelter of claim 1, the at least partially spherical-lune-shaped roll-top hatch further comprising a rubber trim or gasket configured to seal a shelter interior from an exterior during the severe weather event.

15. A shelter, comprising:
    an enclosure adapted to protect a person from a storm, the enclosure having a first at least partially cylindrical-shaped portion and a second elliptical-shaped portion, the first at least partially cylindrical-shaped portion configured to be buried underground and the second elliptical-shaped portion configured to rest above the ground, the second elliptical-shaped portion including at least one transparent or translucent area that allows external light to enter the enclosure;
    at least partially spherical-lune-shaped hatch coupled to the enclosure via one or more joints, the at least partially spherical-lune-shaped hatch having a surface configured to slide against an exterior surface of the enclosure when being opened or closed; and a cylindrical-shaped base portion coupled below the first cylindrical-shaped portion, the base portion having one or more rib segments on an outer surface.

16. The shelter of claim 14, wherein the one or more rib segments have a semi-circular cross-section, and wherein the one or more ribs fully encircle the base portion.

17. The shelter of claim 14, further comprising:
a cage structure positioned within the second elliptical-shaped portion.

18. A shelter, comprising:
an enclosure adapted to protect a person from a storm, the enclosure having a first at least partially cylindrical-shaped portion and a second elliptical-shaped portion, the first at least partially cylindrical-shaped portion configured to be buried in the ground and the second elliptical-shaped portion configured to rest above the ground;
an at least partially spherical-lune-shaped hatch coupled to the enclosure via one or more mounts, the one or more mounts configured to be at least partially removed from within the enclosure to decouple the at least partially spherical-lune-shaped hatch from the enclosure in response to the at least partially spherical-lune-shaped hatch being blocked or damaged, the one or more mounts further comprising a pin or bolt configured to be pushed outwardly from within the enclosure by the person to decouple the at least partially spherical-lune-shaped hatch from the enclosure; and
a cage structure positioned within the second elliptical-shaped portion.

19. The shelter of claim 17, further comprising:
a cylindrical-shaped base portion coupled below the first cylindrical-shaped portion, the base portion having one or more rib segments on an outer surface.

20. The shelter of claim 18, wherein the one or more rib segments have a semi-circular cross-section, and wherein the one or more ribs fully encircle the base portion.

* * * * *